United States Patent
Ghidireac (10) Patent No.: US 8,990,383 B1
(45) Date of Patent: Mar. 24, 2015

(54) ELASTIC SERVICE LEVEL AGREEMENT FOR METRICS ACCURACY COMPUTATION

(75) Inventor: Bogdan Eduard Ghidireac, Iasi (RO)

(73) Assignee: Amazon Technologies, Inc., Seattle, WA (US)

(*) Notice: Subject to any disclaimer, the term of this patent is extended or adjusted under 35 U.S.C. 154(b) by 306 days.

(21) Appl. No.: 13/304,112

(22) Filed: Nov. 23, 2011

(51) Int. Cl.
*G06F 15/173* (2006.01)

(52) U.S. Cl.
USPC ........................................... 709/224

(58) Field of Classification Search
None
See application file for complete search history.

(56) References Cited

U.S. PATENT DOCUMENTS

| | | | |
|---|---|---|---|
| 2003/0055973 A1* | 3/2003 | Kryskow, Jr. | 709/226 |
| 2005/0114860 A1* | 5/2005 | Lin et al. | 718/100 |
| 2005/0138170 A1* | 6/2005 | Cherkasova et al. | 709/225 |
| 2006/0188011 A1* | 8/2006 | Goldszmidt et al. | 375/229 |
| 2008/0028409 A1* | 1/2008 | Cherkasova et al. | 718/104 |
| 2010/0296494 A1* | 11/2010 | Kanodia et al. | 370/336 |

* cited by examiner

*Primary Examiner* — Mohamed Wasel
*Assistant Examiner* — Tsung Wu
(74) *Attorney, Agent, or Firm* — Lee & Hayes, PLLC (57) ABSTRACT

Metrics may be recomputed using available computing resources according to elastic service level agreements (SLAs). The available computing resources may have a predetermined capacity, such as a fixed number of servers, computation time, and/or computation cost. The SLA may define an accuracy, confidence level, or goal that is used when determining a frequency to recompute metrics. The elastic SLA may vary and/or may be adjusted based on a relative difficulty of the computational task, an expected or requested accuracy of the computation task, or other predetermined design constraints.

22 Claims, 4 Drawing Sheets

ELASTIC SERVICE LEVEL AGREEMENT FOR METRICS ACCURACY COMPUTATION

BACKGROUND

The availability and relatively low cost of data storage enables people or entities to store large amounts of data while operating their businesses or performing other computing operations. For example, a large retailer may store data for each transaction that the retailer performs. The retailer may use this data for computations, such as to generate reports for total sales, net revenue, inventory, and other important metrics for the retailer. To perform these computations, the retailer may need access to computing resources that are capable of processing large amounts of transaction data. When the retailer processes thousands or even millions of transactions per day, the cost of computation may become increasingly expensive based on the number of computing resources necessary to perform the computations.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, among other things, to scheduling work to available computing resources according to an elastic service level agreement (SLA). The available computing resources may be a fixed allocation of computing resources, such as a fixed number of servers, computation time, computation cost, or other measurable amount of computing services. For example, the available resources may be determined by a cost of the computing resources for a given time period. The computing resources may be used to perform various computational tasks such as generate reports from large amounts of data. For example, the computational tasks may be performed for a retailer and may be used to generate sales reports for given time periods or intervals.

The computational tasks may be performed in accordance with an elastic SLA. The SLA may define an accuracy, confidence level, or goal that is used when determining a frequency of a computational task. The elastic SLA may be selected or modified based on a relative difficulty (e.g., resource intensiveness) of the computational task, an expected or requested accuracy of the computation task, or other predetermined design constraints. For example, a first task may include computing sales for a first time period, such as for a current day. The first task may have a first SLA, such as 99.5, which may target a 99.5% accuracy value for data resulting from the first task at any given time when the data is accessed by a user or entity. The first task (order metrics, etc.) may be recomputed many times during the day to update the data and maintain the 99.5 SLA. In contrast, a second task may include computing sales for a second time period, such as for a current week. The second task may have a second SLA, such as 98.2, which may be a lower SLA than the first SLA. The second SLA may result in the second task being performed less frequently than the first task. The first and second tasks may also include priority values, which may or may not be based on the respective SLAs. For example, when both the first task and second task are due to be computed because each have reached or are predicted to reach an SLA defining a respective metrics accuracy threshold, then the SLA and/or other factors may be used to prioritize one task over the other. In some embodiments, tasks may also be performed concurrently and/or in parallel.

In accordance with various embodiments, the SLAs may be determined based on the available computing resources so that the respective tasks can be performed to achieve their respective SLAs. The SLAs may be updated periodically based on various factors, such as increased workflow, modified design requirements, and/or for other reasons, and thus are elastic.

The techniques and systems described herein may be implemented in a number of ways. Example implementations are provided below with reference to the following figures.

Illustrative Environment

Figure 1:
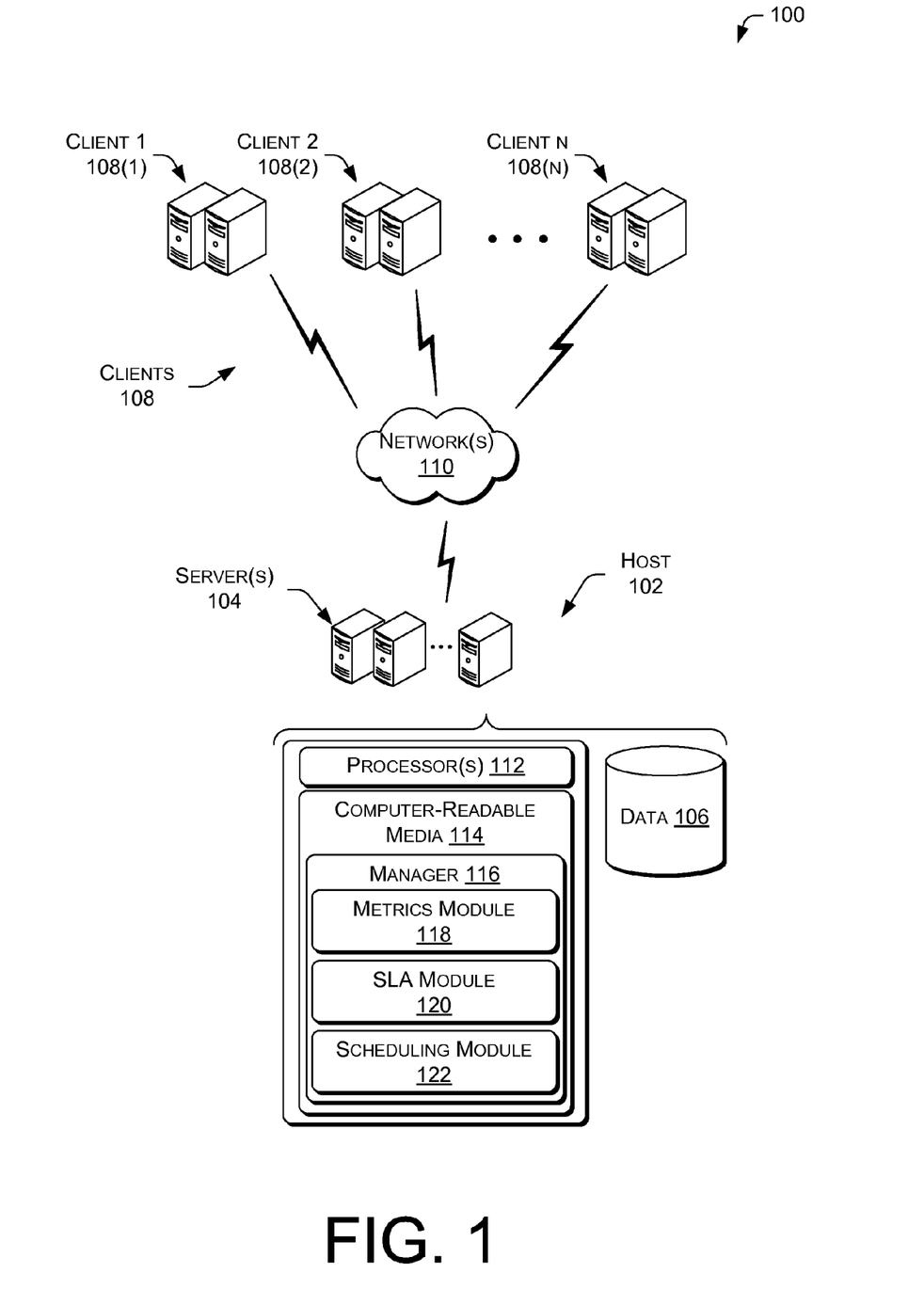
FIG. 1 is a schematic diagram of an illustrative computing environment to use an elastic service level agreement (SLA) for metrics accuracy computation.

FIG. 1 is a schematic diagram of an illustrative computing environment 100 to use an elastic service level agreement (SLA) for metrics accuracy computation. The environment 100 may include a host 102 that includes servers 104 that perform computations using data 106. The servers 104 may be configured in a distributed or non-distributed computing system, such as in a cloud service, a server farm, or other type of configuration, which may enable the servers to process large amounts of work (computations), and may enable scalability of the servers based on various constraints, such as capacity, cost, and other types of constraints. The data 106 may be continually, periodically, or randomly updated based on various events, such as a transaction with a user, sales, or other types of events.

The servers 104 may provide data to clients 108 via a network 110. The clients 108 may include various types of different clients, which may be part of a same organization or independent from one another. Each client may request and/or or require different types of data from the host 102. For example, a first client 108(1) may request sales data at a given service level agreement (SLA), while a second client 108(2) may request sales data at a second SLA and another client 108(n) may request the sales data at yet another SLA or at one of the other SLAs. Thus, each client may be able to specify or select an SLA that is appropriate for the client's needs. The SLA may be used to determine a cost of associated with use of the servers 104, and thus a lower SLA may be associated with a lower cost to a client having the lower SLA.

The host 102 may manage the SLAs such that the SLAs are selected to enable the host, via the servers 104, to process predefined jobs that, when processed, update metrics. For example, the host 102 may perform a particular job that includes computation of metrics from the data 106. The computations may be repeated for different segments of time (time intervals) to refresh the metrics and maintain an SLA that defines an accuracy for the metrics. For example, a first segment of time may include a current day with a first SLA that is higher than a second SLA corresponding to a second segment of time that includes a current week, and so forth. In this example, the host 102 may assume that today's metric (the first segment) has a greater need for accuracy as defined by the higher SLA. The host 102 may determine or assign the first SLA, the second SLA, and any other SLAs such that the host 102 is capable of performing the predefined jobs according to the SLAs. The SLAs may be adjusted, and thus elastic, when the host 102 is unable to process the predefined jobs in accordance with the SLAs or for other reasons, such as because of changes in the available resources (servers, etc.) used by the host 102.

The servers 104 may include one or more processor(s) 112 and computer-readable media 114. The processor(s) 112 interact with the computer-readable media 114 to execute instructions and facilitate operation of the servers 104. The computer-readable media 114 may include software programs or other executable modules that may be executed by the processor(s) 112. Examples of such programs or modules include operating systems, applications, and so forth. The computer-readable media 114 may also be used to store data.

The computer-readable media 114 may include volatile memory (such as RAM), nonvolatile memory, removable memory, and/or non-removable memory, implemented in any method or technology for storage of information, such as computer-readable instructions, data structures, program modules, or other data. Also, the processor(s) 112 may include onboard memory, which in some instances may be the computer-readable media 114. Some examples of storage media that may be included in the computer-readable media 114 and/or processor(s) 112 include, but are not limited to, random access memory (RAM), read only memory (ROM), electrically erasable programmable read only memory (EE-PROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the server 104. Any such computer-readable media may be part of the server 104.

In accordance with one or more embodiments, the computer-readable media 114 may include a manager 116. The manager 116 may interact with the data 106 to manage computation of the metrics in accordance with the elastic SLAs and predefined restrictions on use of computing resources and/or availability of the computing resources. The manager 116 may include a metrics module 118, an SLA module 120, and a scheduling module 122, each described in turn.

The metrics module 118 may initiate jobs to process the data 106 to update and maintain metrics, such as order metrics, for the clients 108. The metrics module 118 may define the metrics as having different inputs, different amounts of the data 106 (e.g., different time intervals of the data), or other variations. The metrics module 118 may also monitor a metrics accuracy of the metrics. For example, the metrics module 118 may track new events (e.g., orders, etc.) for one or more time intervals that, until a recomputation is performed, reduce a current accuracy of the metrics.

The SLA module 120 may determine an SLA for each of the metrics updated, maintained, or monitored by the metrics module 118. The SLA may define a metrics accuracy threshold for the metrics that, when reached or predicted to be reached, triggers a recomputation of the metrics. The SLA module 120 may determine the SLAs so that the metrics may be computed using a predetermined amount of computational resources. For example, the SLA module 120 may create SLAs, and then determine whether the metrics can be maintained in accordance with the SLAs using the predetermined amount of computational resources. When the metrics cannot be maintained in accordance with the SLAs, then the SLA module 120 may adjust the SLAs automatically or with human input (e.g., alert administrator, etc.).

The scheduling module 122 may schedule the jobs to be performed to update the metrics in accordance with the SLAs using the computational resources. The scheduling module 122 may determine the availability of the computational resources to process the recomputation of the metrics. When the scheduling module 122 is unable to meet the SLA for a metric, the then the scheduling module 122 may transmit a message to an administrator and/or request an update to the SLAs by the SLA module 120 and/or request additional computational resources. In some embodiments, when the scheduling module 122 determines that the computational resources are underutilized, the scheduling module may transmit a message to the SLA module 120 to indicate that the SLAs may be increased or otherwise may report the utilization of the computational resources.

Illustrative Operations

Figure 2:
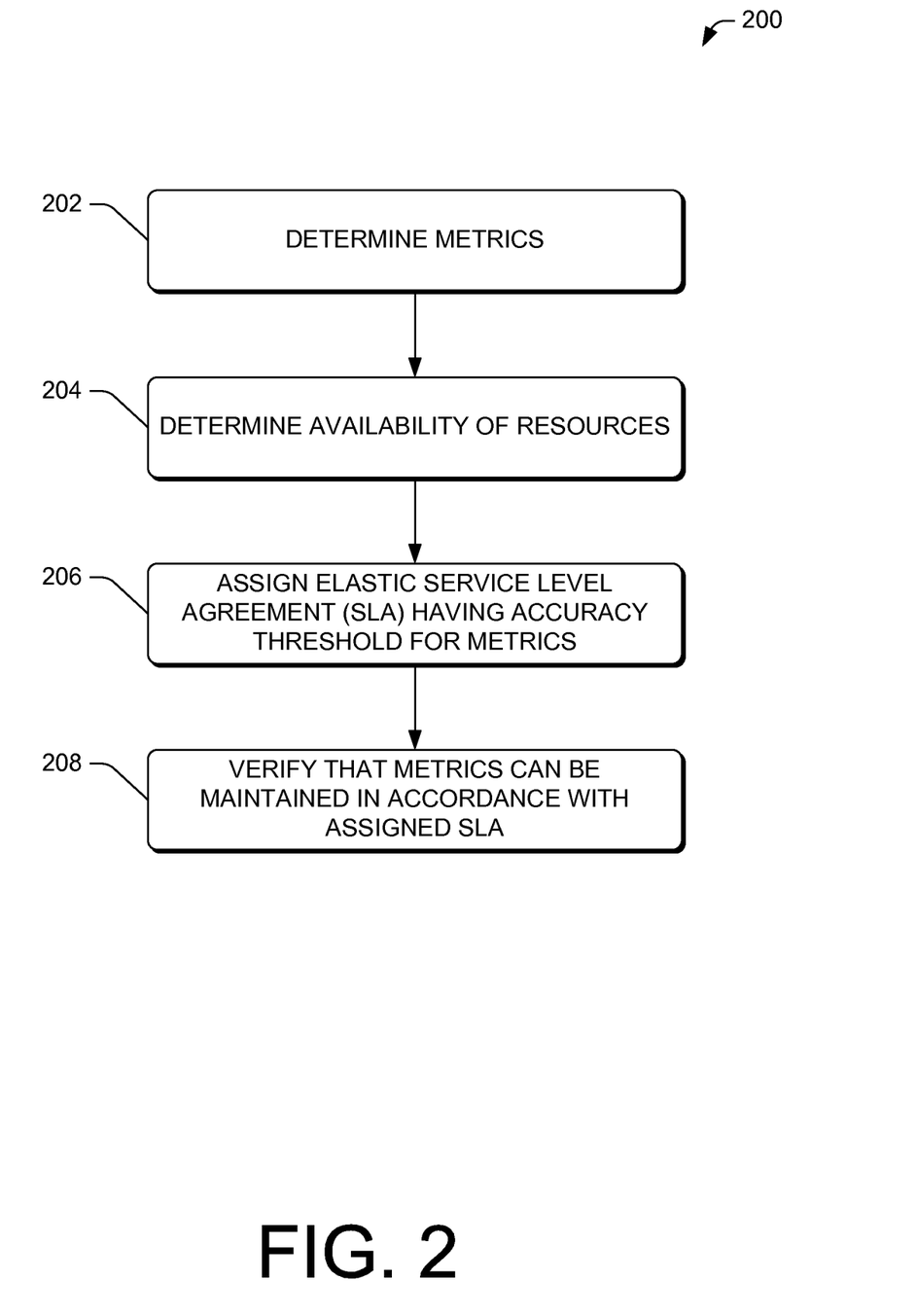
FIG. 2 is a flow diagram of an illustrative process to determine an elastic SLA for tasks based on available resources.
Figure 3:
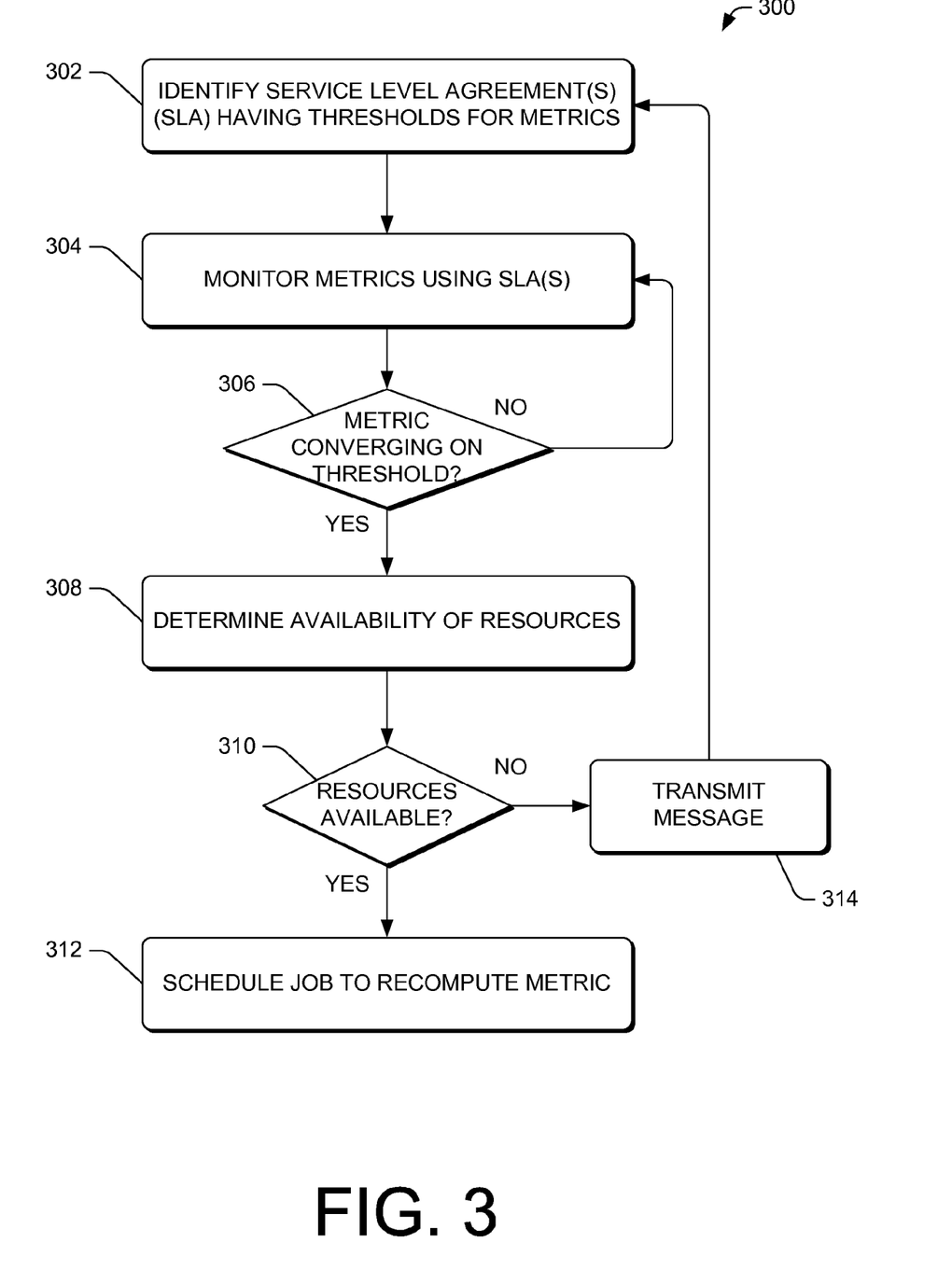
FIG. 3 is a flow diagram of an illustrative process to schedule a job to recompute metrics based on an elastic SLA and to provide messaging when available computing resources cannot achieve the SLA.
Figure 4:
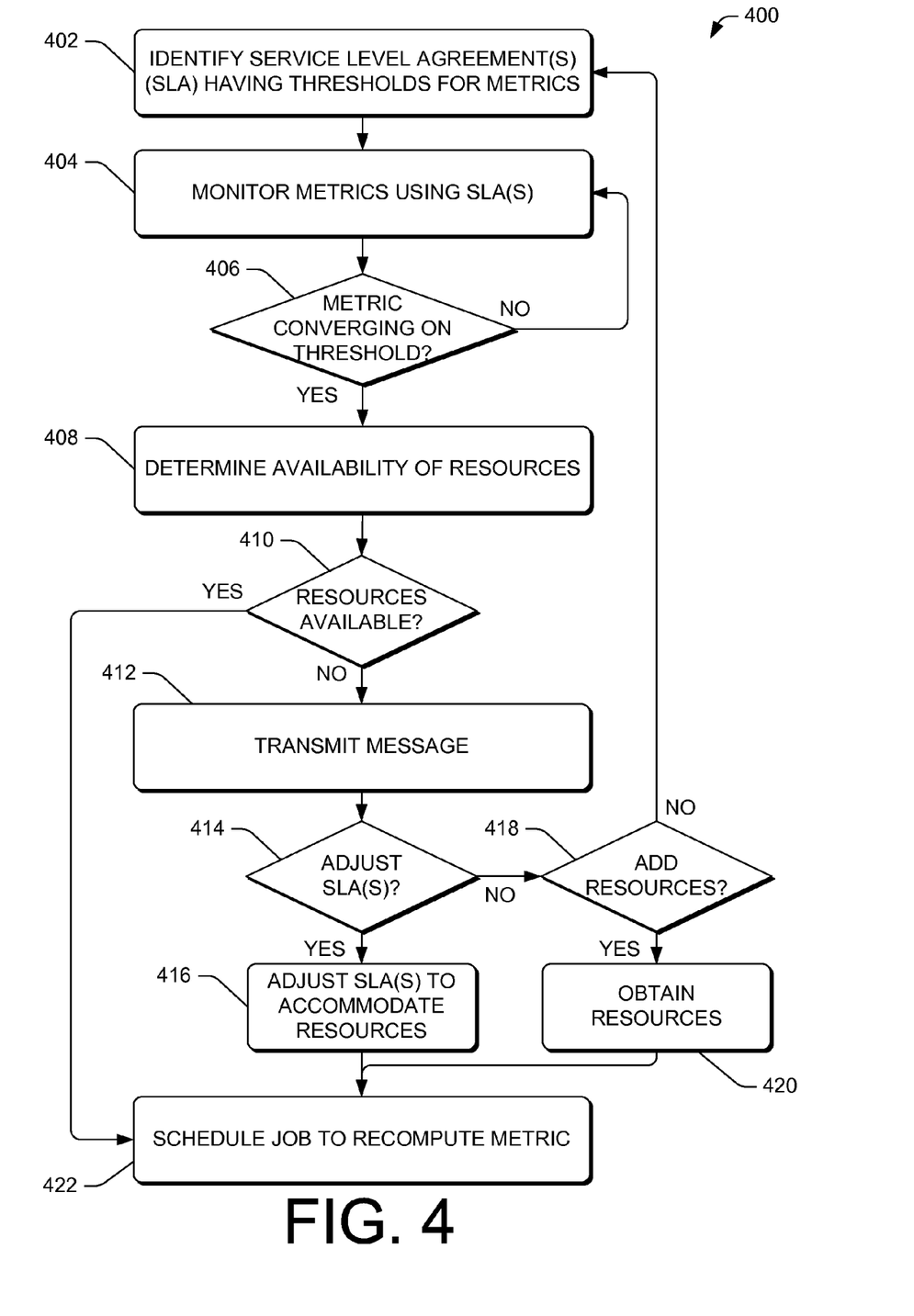
FIG. 4 is a flow diagram of another illustrative process to schedule a job to recompute metrics based on an elastic SLA.

FIGS. 2-4 describe illustrative processes to provide the elastic SLA. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The processes are described with reference to the environment 100 and may be performed by the servers 104. Of course, the processes may be performed in other similar and/or different environments.

FIG. 2 is a flow diagram of an illustrative process 200 to determine an elastic SLA for metrics based on available computational resources.

At 202, the metrics module 118 may determine the metrics that are to be maintained by the servers 104 through the processing of jobs. A job may be a computation of a metric from the data 106, and may be processed many times during a time interval. As time progresses, the job may be performed over and over to update the metrics. Thus, the job may be a predetermined set of computations, which may be executed or computed by the computing resources many times over a given time interval to update or maintain the metrics.

At 204, the scheduling module 122 may determine an availability of computational resources that can be used to maintain the metrics determined at the operation 202. The availability of computational resources may be a capacity of the computational resources based on physical constraints, monetary constraints, or other types of constraints on use of the computing resources.

At 206, the SLA module 120 may assign an elastic SLA having an accuracy threshold for the metrics determined by the metrics module 118 at the operation 202. For example, the SLA module 120 may select an SLA for metric that enables the metric to be maintained with the other metrics using the available computing resources determined by the operation 204. In some embodiments, the SLA module 120 may determine the SLAs for the metrics using an iterative approach, thereby assigning an SLA to each metric and then determining the computational resources necessary to achieve the particular SLA for that metric. The SLA module 120 may adjust the SLAs when the SLAs cannot be achieved by the computational resources and/or underutilize the computational resources.

At 208, the scheduling module 122 may verify that the metrics can be maintained in accordance with the assigned SLA based at least in part on the SLAs and the availability of the computational resources. For example, the scheduling module 122 may use the SLAs to assign a frequency of computation of the various jobs based on the SLAs and the availability of the computational resources. The scheduling module 122 may provide feedback to the SLA module 120 to indicate when the computational resources are over utilized or underutilized to enable the SLA module 120 to adjust the SLAs, thereby creating elastic SLAs.

FIG. 3 is a flow diagram of an illustrative process 300 to schedule a job to recompute the metrics based on an elastic SLA and to provide messaging when available computing resources cannot achieve the SLA. The elastic SLA may be determined using the process 200 described above.

At 302, the SLA module 120 may identify the SLA having a threshold for one or more metrics.

At 304, the metrics module 118 may monitor the metrics using the SLAs identified at the operation 302. For example, the metrics module 118 may determine an estimated accuracy of the metrics in view of a metrics accuracy threshold defined by the SLA for the metrics. The monitoring may involve monitoring orders placed after a last computation of the metrics and/or may involve monitoring other data.

At 306, the metrics module may determine whether the metrics accuracy of the metrics reaches or is predicted to reach the metrics accuracy threshold of the SLA. For example, in some instances the metrics may be scheduled for recomputation (e.g., processing a corresponding job) when the accuracy threshold is reached or exceeded. The metrics may also be scheduled for recomputation when the metrics accuracy threshold of the SLA is about to be reached (e.g., converging on SLA or predicted to reach SLA). In this situation a lower threshold or buffer maybe used to track a cutoff point which may trigger recomputation of the metrics via processing of a corresponding job. When the metrics accuracy of the metrics reaches or is predicted to reach the metrics accuracy threshold of the SLA at 306, then the process may advance to the operation 308, otherwise the monitoring may continue at the operation 304 via a loop.

At 308, the scheduling module 122 may determine the availability of the scheduled computational resources. For example, the computational resources may include queues that may receive the jobs for processing, and may dispatch jobs to recompute the metrics to available computational resources or portions of the computational resources. The scheduling module 122 may also reallocate the computational resources using the queues to adjust processing power to focus on particular jobs, such as jobs having a higher priority than other jobs. At 310, the scheduling module 122 may determine whether the computations resources are available to perform the job to recompute the metrics in accordance with the SLA. When the scheduling module 122 is able to identify available ones of the computational resources, then following the "yes" route from the decision operation 308, the scheduling module 122 may schedule the job at 312 to recompute the metrics. The scheduling of the job may be based at least in part on the SLA and the availability of the computational resources. In some embodiments, the scheduling of the jobs to recompute the metrics may include a priority of the metrics. For example, if two metrics are both scheduled to be recomputed and await available computational resources, one of the jobs may have priority over the other job. The priority may be based on the SLA or on other factors. In some embodiments, the jobs may be performed (metrics recomputed) concurrently or in parallel. For example, when both jobs include recomputation of metrics that include a same time interval, the computations may be performed concurrently. When the available resources have availability to process two or more jobs at a same time (or overlapping time), then the jobs may be performed in parallel.

However, when the scheduling module 122 is not able to identify available ones of the computational resources, then following the "no" route from the decision operation 310, the scheduling module 122 may transmit a message at 314 to an administrator indicating that the SLA cannot be maintained with the currently available resources. The administrator may adjust the SLA, add more computational resources, or take other actions. Processing may continue at 302 in some embodiments.

In some embodiments, a metric may not converge on the threshold, may not reach the SLA, or be predicted to reach the SLA as determined at the operation 306. In these instances, the metric may not be updated and no job may be scheduled at the operation 312. Thus, the process 300 may continually loop between operations 304 and 306 when a metric has reached a steady state and no longer needs recomputation because the accuracy does not change. This may occur for order metrics for a time interval in the past, such as metrics for orders that occurred between five and ten years in the past (or other older time intervals).

FIG. 4 is a flow diagram of another illustrative process 400 to schedule a job to recompute metrics based on an elastic SLA. The operations 402-408 may be similar or the same as the operations 302-308, respectively.

At 410, the scheduling module 122 may determine whether the computations resources are available to perform the job while maintaining the SLA for the metrics. When the scheduling module 122 is not able to identify available ones of the computational resources, then following the "no" route from the decision operation 408, the scheduling module 122 may transmit a message to an administrator at 412 indicating that the SLA cannot be maintained for the metrics with the currently available computing resources.

At 414, the SLA module 120 may determine whether the SLAs can be adjusted to accommodate recomputation of the metrics in light of the available computational resources. When the SLAs can be adjusted (following the "yes" route from the decision operation 412), then the SLA module 120 may adjust the SLA at 416 to reduce a frequency of the recomputation of the metrics in view of the availability of the computational resources. However, when the SLAs cannot be adjusted for various reasons (following the "no" route from the decision operation 414), then the process 400 may continue at a decision operation 418.

At 418, the scheduling module may determine whether additional computational resources may be added to enable maintaining the SLAs and scheduling the job to recompute the metrics. When additional computational resources are available and able to be obtained (e.g., due to budget constraints, business rules, etc.) (following the "yes" route from the decision operation 418), then the scheduling module 122 may obtain the additional resources at 420. For example, the additional resources may be added in a scalable system at an increased cost. However, when additional computational resources are not available or not able to be obtained (e.g., due to cost constraints or other constraints) (following the "no" route from the decision operation 418), then the process may advance to the operation 404 and processing may continue as described above.

When the scheduling module 122 is able to identify available ones of the computational resources at the decision operation 410 (following the "yes" route from the decision operation 410), or following the operations 416 or 420, then the scheduling module 122 may schedule the job at 422.

Illustrative Order Processing Example

The following example is provided to highlight a possible use case to implement elastic SLAs in an order processing environment to maintain order metrics based on the elastic SLAs. Although the example discusses SLAs specific to a retail environment, the SLAs may be used in other environments in accordance with the processes described above.

An order transaction system may compute real-time or near real-time order metrics for one or more marketplaces, such as electronic marketplaces, brick-and-mortar marketplaces, or both. The order transaction system may take into consideration that orders processed by the system may change over time, such as by changing of a price, item quantity, and/or condition. Thus, the order transaction system may have to update order metrics periodically (i.e., recompute by processing a job) in accordance with a service level agreement (SLA) for the order metrics.

In some embodiments, the order metrics may be computed for various intervals of time, such as hourly, daily, weekly, monthly, annually, and/or for other intervals of time. Each interval of time may define a different job. Because the orders may change over time due to returns, corrections, exchanges, or for other reasons, each of these jobs (time periods) may be recomputed periodically to maintain an SLA corresponding to the computational job.

The computational resources may be fixed based on budgetary constraints, physical constraints, and/or other types of constraints. Thus, the SLAs may be tailored to enable processing the jobs within a capacity of the computational resources.

In accordance with various embodiments, the SLAs may be computed per time intervals. For example, in a first time interval, three events may occur in the order system: 1) 1 item, $7 total; 2) 2 items, $10 total; and 3) 1 item, $3 total. In this first time interval, the total price is $20 with 4 total items. In a second interval that includes the first interval plus additional time, the following events may occur: 4) 2 items, $8 total, and 5) 1 item, $6 total. Thus, the second interval may include a total price of $34 and 7 total items.

The metrics accuracy confidence level (MACL) may be defined by

Equation 1:

$$MACL[OTi, OTj] = \frac{\text{Events during the last computation}}{\text{Total quantity of events}} \quad \text{Equ. (1)}$$

In the example order data above, at event time 2 (second interval), even if 5 events have occurred, the order system may only have the metrics computed for the first 3 metrics because the order system has not yet recomputed the order metrics. Thus, the MACL[OT1, OT2]=3/5=0.6. Price accuracy may be computed in the same way, and thus result in Price accuracy [OT1, OT2]=20/34=0.58. Items accuracy may be computed as Items accuracy [OT1, OT2]=4/7=0.57.

However, in a large scale system, hundreds, thousands, or even millions of evens may occur each hour or other time interval. The confidence level may converge to a value of one (confident level→1) when no new events occur.

An elastic SLA enables use of a variable and assignable accuracy per time interval. The elastic SLA may specify better accuracy for some intervals than other intervals. For example a most recent interval (e.g., last hour, etc.) may include a greater SLA than a second most recent interval (e.g., last two hours, etc.), and so forth. An administrator's priorities may change over time so the SLA is elastic and can be redefined to adjust distribution of the computational resources (e.g., computational power) in order to achieve the revised SLA. In addition, an amount of data may increase over time, which may result in adjustment of the SLAs and/or an expansion of the available computational resources.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed on one or more processors, performs acts comprising:
identifying a service level agreement (SLA) for order metrics, the SLA to define a metrics accuracy threshold for the order metrics that, when reached or predicted to be reached, triggers a recomputation of the order metrics;
determining an available computational capacity executed by one or more computing devices to process the recomputation of the order metrics;
monitoring a metrics accuracy of the order metrics; and
in response to the monitored metrics accuracy of the order metrics reaching or being predicted to reach the metrics accuracy threshold of the SLA:
determining, based at least in part on the available computational capacity, if the recomputation of the order metrics can be performed by the available computational capacity while maintaining the SLA;
scheduling the recomputation of the order metrics at least partly in response to determining that the recomputation of the order metrics can be performed by the available computational capacity while maintaining the SLA; and
at least partly in response to determining that the recomputation of the order metrics cannot be performed by the available computational capacity while maintaining the SLA:
expanding a computational capacity executed by the one or more computing devices in response to an availability of additional computational capacity; and
adjusting the SLA in response to the additional computational capacity being unavailable.

2. The one or more non-transitory computer-readable media as recited in claim 1, wherein the order metrics are computations for predetermined time intervals, the order metrics being updated a plurality of times to maintain the SLA.

3. The one or more non-transitory computer-readable media as recited in claim 1, wherein the order metrics are recomputed using data that includes transaction data identifying previous transactions conducted over time.

4. The one or more non-transitory computer-readable media as recited in claim 1, wherein the scheduling the recomputation of the order metrics includes assigning a job to a queue for computation by the available computational capacity executed by the one or more computing devices.

5. The one or more non-transitory computer-readable media as recited in claim 1, wherein the monitoring includes tracking new events for at least a predetermined time interval that, until a recomputation is performed, reduce a current accuracy of the order metrics.

6. One or more non-transitory computer-readable media storing computer-executable instructions that, when executed on one or more processors, performs acts comprising:
   determining a service level agreement (SLA) for order metrics, the SLA to define a metrics accuracy threshold for the order metrics that, in response to reaching or being predicted to be reached, triggers a recomputation of the order metrics;
   determining an available computational capacity executed by one or more computing devices to process the recomputation of the order metrics;
   monitoring a metrics accuracy of the order metrics; and
   in response to the monitored metrics accuracy of the order metrics reaching or being predicted to reach the metrics accuracy threshold of the SLA:
      determining, based at least in part on the available computational capacity executed by the one or more computing devices, if the recomputation of the order metrics can be performed by the available computational capacity while maintaining the SLA and without exceeding a predefined capacity of the one or more computing devices; and
      scheduling the recomputation of the order metrics at least partly in response to determining that the recomputation of the order metrics can be performed by the available computational capacity executed by the one or more computing devices while maintaining the SLA and without exceeding the predefined capacity of the one or more computing devices.

7. The one or more non-transitory computer-readable media as recited in claim 6, wherein the acts further comprise transmitting a message to an administrator at least partly in response to determining that the recomputation of the order metrics cannot be performed by the available computational capacity executed by the one or more computing devices while maintaining the SLA or cannot be performed without exceeding the predefined capacity of the computational resources one or more computing devices.

8. The one or more non-transitory computer-readable media as recited in claim 6, wherein the acts further comprise increasing the predefined capacity of the one or more computing devices at least partly in response to determining that the recomputation of the order metrics cannot be scheduled while maintaining the SLA and when additional capacity executed by the one or more computing devices is available.

9. The one or more non-transitory computer-readable media as recited in claim 6, wherein the acts further comprise adjusting the SLA at least partly in response to determining that the recomputation of the order metrics cannot be performed by the available computational capacity executed by the one or more computing devices based on the predefined capacity, and when additional capacity of the one or more computing devices is not available.

10. The one or more non-transitory computer-readable media as recited in claim 6, wherein the order metrics are computations for predetermined time intervals.

11. The one or more non-transitory computer-readable media as recited in claim 10, wherein the monitoring includes tracking new events for at least one of the predetermined time intervals that, until a recomputation is performed, reduce a current accuracy of the order metrics.

12. The one or more non-transitory computer-readable media as recited in claim 6, wherein the order metrics are recomputed using data that includes transaction data identifying previous transactions conducted over time.

13. The one or more non-transitory computer-readable media as recited in claim 6, wherein the scheduling the recomputation of the order metrics includes assigning a job to a queue for computation by the available computational capacity executed by the one or more computing devices.

14. The one or more non-transitory computer-readable media as recited in claim 6, wherein the acts further comprise revising the SLA to reduce or increase a frequency of the recomputation of the order metrics by the available computational capacity executed by the one or more computing devices computing device.

15. The one or more non-transitory computer-readable media as recited in claim 6, wherein the acts further comprise revising the SLA for performance of the available computational capacity executed by the one or more computing devices when the scheduling of the recomputation of the order metrics results in under-utilization of the available computational capacity executed by the one or more computing devices, the revising the SLA to increase the metrics accuracy threshold of the SLA.

16. A method comprising:
   determining a plurality of metrics to be recomputed based at least in part on data that is updated over time;
   determining an availability of computational capacity executed by one or more computing devices to perform recomputation of the metrics;
   assigning, via one or more processors, service level agreements (SLAs) to individual ones of the metrics to enable recomputation of the metrics within the determined availability of the computational capacity executed by the one or more computing devices, the SLAs to provide an accuracy threshold for individual ones of the metrics that results in a frequency of the recomputation of the metrics; and
   verifying that the SLA for the metrics can be maintained through recomputation of the metrics by the determined availability of the computational capacity executed by the one or more computing devices.

17. The method as recited in claim 16,
   further comprising updating the SLAs using an iterative process to ensure that the assigned SLAs enable maintaining of the metrics in accordance with the assigned SLAs and without exceeding the determined availability of the computational capacity executed by the one or more computing devices.

18. The method as recited in claim 16, wherein the recomputation of the metrics comprises performing computations of different time intervals of data.

19. The method as recited in claim 16, further comprising revising the SLAs to reduce the frequency of the recomputation of the metrics when the verifying indicates exceeding the determined availability of the computational capacity executed by the one or more computing devices.

20. A system comprising:
   one or more processors;
   memory to store computer-executable instructions;
   a metrics module stored in the memory and executable by the one or more processors to monitor a metrics accuracy of metrics, the metrics being periodically recomputed by an available computational resources capacity executed by one or more computing devices having a predetermined capacity;

a service level agreement (SLA) module stored in the memory and executable by the one or more processors to define a metrics accuracy threshold for the metrics that, in response to reaching or being predicted to be reached, triggers a recomputation of the metrics, the SLA module configured to modify the SLA in response to a determination that the available computational capacity executed by the one or more computing devices cannot maintain an SLA associated with recomputation of the metrics; and a scheduling module stored in the memory and executable by the one or more processors to (i) determine the available computational capacity executed by the one or more computing devices and (ii) schedule the recomputation of the order metrics after in response to the monitored accuracy of the metrics reaching or being predicted to reach the metrics accuracy threshold and the recomputation can be performed by the available computational capacity executed by the one or more computing devices while maintaining the SLA.

21. The system as recited in claim 20, wherein the scheduling module further transmits a message to an administrator after determining that the recomputation of the order metrics cannot be performed by the available computational capacity executed by the one or more computing devices while maintaining the SLA.

22. The system as recited in claim 20, wherein SLA module modifies the SLA to create a new SLA after the scheduling module determines that the recomputation of the metrics cannot be performed by the available computational capacity executed by the one or more computing devices while maintaining the SLA.

\* \* \* \* \*